(12) United States Patent
Earl et al.

(10) Patent No.: US 7,703,830 B2
(45) Date of Patent: Apr. 27, 2010

(54) WINDOW ASSEMBLY HAVING AN INTEGRAL BONDING SYSTEM

(75) Inventors: James M. Earl, Lawrenceburg, TN (US); Shawn L. Walters, Etheridge, TN (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 621 days.

(21) Appl. No.: 11/439,154

(22) Filed: May 23, 2006

(65) Prior Publication Data

US 2006/0267368 A1  Nov. 30, 2006

Related U.S. Application Data

(60) Provisional application No. 60/684,275, filed on May 25, 2005.

(51) Int. Cl.
*B60J 1/00* (2006.01)

(52) U.S. Cl. .................................................. 296/84.1

(58) Field of Classification Search ............ 296/146.15, 296/96.22, 96.25, 84.1, 201; 52/100, 204, 52/204.591, 208, 591
See application file for complete search history.

(56) References Cited

U.S. PATENT DOCUMENTS

| | | | | |
|---|---|---|---|---|
| 5,478,132 | A * | 12/1995 | Gold ..................... | 296/146.15 |
| 5,806,257 | A * | 9/1998 | Cornils et al. ................. | 52/208 |
| 5,864,996 | A * | 2/1999 | Veldman et al. ......... | 52/204.597 |
| 5,897,937 | A * | 4/1999 | Cornils et al. ................ | 156/242 |
| 5,998,730 | A * | 12/1999 | Shiozaki et al. ............. | 136/256 |
| 7,210,729 | B2 * | 5/2007 | Hammaker et al. .... | 296/146.15 |
| 2003/0192256 | A1 * | 10/2003 | Dedrich et al. ................ | 49/404 |
| 2004/0188016 | A1 * | 9/2004 | Mahdi et al. ................ | 156/329 |

* cited by examiner

*Primary Examiner*—Lori L Lyjak
(74) *Attorney, Agent, or Firm*—Gifford, Krass, Sprinkle, Anderson & Citkowski, P.C.; Kevin S. MacKenzie; Dean B. Watson

(57) ABSTRACT

A window assembly for a vehicle includes a window opening defined by a margin of material. The window assembly also includes a window having an adhesive member bonded on it prior to an installation operation on a vehicle. The adhesive member is further bonded to the margin of material when the window assembly is attached to the vehicle.

16 Claims, 6 Drawing Sheets under the window assembly having an integral bonding system

RELATED APPLICATION

This application claims priority of U.S. Provisional Patent Application Ser. No. 60/684,275 filed May 25, 2005, which is incorporated herein by reference.

FIELD OF THE INVENTION

The invention relates to window assemblies.

BACKGROUND OF THE INVENTION

Window assemblies may be attached to openings formed in the sheet metal of a vehicle using fasteners and separate adhesive systems that are attached to the vehicle in a manufacturing facility. Such bonding systems require the use of a separate attachment operation for the adhesive leading to a more complex assembly in a manufacturing facility.

There is therefore a need in the art for an improved window assembly including an integrated bonding system that is easier to install in a vehicle. There is also a need in the art for a window assembly that that can be installed with a reduced number of operations.

SUMMARY OF THE INVENTION

A window assembly for a vehicle includes a window opening defined by a margin of material. The window assembly also includes a window having an adhesive member bonded on it prior to an installation operation on a vehicle. The adhesive member is further bonded to the margin of material when the window assembly is attached to the vehicle.

DETAILED DESCRIPTION OF THE PREFERRED EMBODIMENTS

Figure 1:
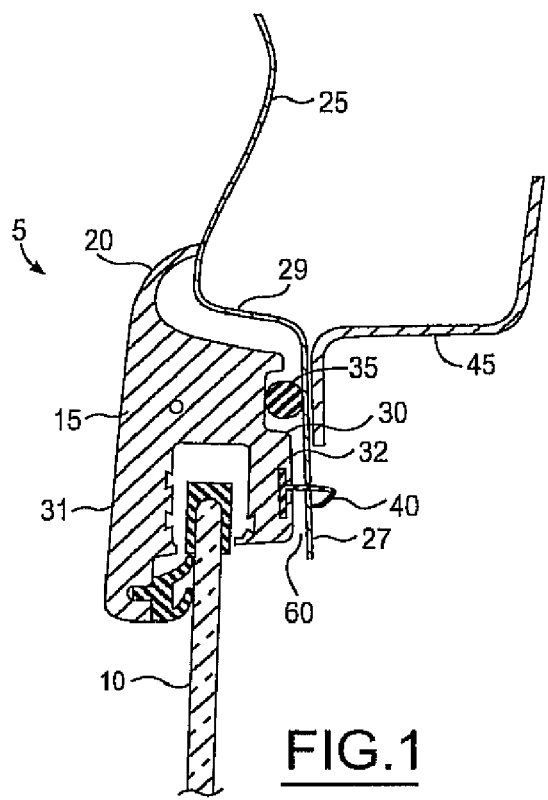
FIG. 1 is a sectional view of a first embodiment of a window assembly having an integral bonding system according to the present invention.

Referring to FIG. 1, there is shown a window assembly 5 according to a first embodiment of the present invention. The window assembly 5 includes a window 10 having an integrally formed encapsulation member 15 formed on the end of the window 10. The encapsulation member 15 may be molded connected on the window 10 prior to an installation operation of the window assembly 5 onto a vehicle. The encapsulation member 15 may be formed of suitable plastic resins including poly vinyl chloride (PVC), other thermo-set plastic resins and polyurethane resins. The encapsulation member 15 includes a curved top portion 20 for abutting with the sheet metal 25 of a vehicle to provide a concealing or finished edge with the sheet metal 25 on the exterior of the vehicle. It is to be understood that the sheet metal 25 may include a coating of paint or a clear coat, as is commonly applied in the automotive industry. The sheet metal 25 of the present invention may or may not include the paint or clear coat without departing from the invention.

Additionally, the encapsulation member 15 includes a pocket or notch 30 formed on an inboard side 32 or the side proximate the sheet metal 25, for receiving an adhesive member 35. The inboard side 32 of the encapsulation member 15 also includes a location fastener 40 associated with the encapsulation member 15, such that the window assembly 5 may be located properly within a window opening defined by the margins of the material of the sheet metal 25 of the vehicle. The pictured fastener is of a J-clip design that passes through a slot formed in the sheet metal 25 and abuts a back surface 27 of the sheet metal 25. Other types of fasteners including Christmas tree and other clip designs may be utilized by the present invention. The fasteners provide a location feature, as well as allow the adhesive member 35 to properly wet out and cure to form a bond with the sheet metal 25, as will be discussed in more detail below.

The sheet metal 25 of the vehicle preferably includes an inwardly projecting flange 29 formed proximate to where the encapsulation member 15 is attached to the sheet metal 25. The flange 29 allows for the encapsulation member 15 to be attached to the sheet metal 25, such that an outer side 31 of the encapsulation member 15 is presented in an aesthetically pleasing appearance relative with the sheet metal 25. An inner reinforcement member 45 contacts the flange 29 formed in the sheet metal 25 to provide strength and rigidity to the sheet metal 25 for attachment of the encapsulation member 15, as will be described in more detail below.

As stated above, the adhesive member 35 is positioned within the notch 30 formed in the inboard side 32 of the encapsulation member 15. The adhesive member 35 provides a barrier to prevent the intrusion of debris or foreign material in the space between the encapsulation member 15 and the sheet metal 25, as well as bonds the encapsulation member 15 to the sheet metal 25. The adhesive member 35, in one aspect, is a pressure sensitive tape or strip that is positioned in the notch 30 formed on the inboard side 32 of the encapsulation member 15. The adhesive member 35 includes a core 50 that may be a solid material or closed cell foam that is compressible with a layer of adhesive material 55 applied to an exterior surface of the core 50. The core 50 maintains the gap 60 formed between the encapsulation member 15 and the sheet metal 25 to prevent noise and vibration. The core 50 may have various profiles, including the oval or circular profile shown in FIG. 1 or it may have a square, rectangular or hexagonal profile, as shown in FIGS. 2 through 6.

The adhesive material 55 disposed on the exterior surface of the core 50 includes properties such as the ability to adhere to both a plastic material and a metal surface. Additionally, the cure time and bonding properties of the adhesive material 55 are designed such that the window assembly 5 may be positioned and attached to the sheet metal 25 in an assembly plant upon contact. Alternatively, the adhesive material 55 may be designed to have a relatively short cure time allowing some manipulation before the attachment operation is complete.

In one aspect of the present invention, the adhesive member 35 is attached to the encapsulation member 15 in the notch 30 prior to attaching to the sheet metal 25, and a barrier or liner is applied to the remaining portion of the adhesive member 35 for shipment to an assembly plant, without the adhesive curing. The barrier prevents contaminants from coming into contact with the adhesive member 35 before attachment to the sheet metal 25, which may result in a weakened bond with the sheet metal 25.

In use, the encapsulation member 15 is formed around the window 10. The adhesive member 35 is then positioned within the notch 30 formed on the inboard side 32 of the encapsulation member 15, attaching the adhesive member 35 to the encapsulation member 15. Next, a barrier may be applied to the adhesive member 35 not in contact with the encapsulation member 15 for shipment to an assembly plant. The barrier may be removed at the assembly plant and the widow assembly 5 may be aligned with the window opening, such that the fasteners 40 of the encapsulation member 15 are received within slots or holes formed in the sheet metal 25 to properly locate the window assembly 5. The core 50 and adhesive material 55 contact the sheet metal or painted surface 25, such that the gap 60 between the sheet metal 25 and encapsulation member 15 is maintained. The adhesive material 55 is allowed to cure resulting in the bonding of the window assembly 5 to the sheet metal 25 of a vehicle without the use of mechanical fasteners or urethane adhesives, requiring additional assembly operations. Appropriate bonding promoters or agents may be applied to the encapsulation member 15 or sheet metal 25 prior to application of the adhesive member 35 to assist in the adhesion or curing of the adhesive member 35.

Figure 2:
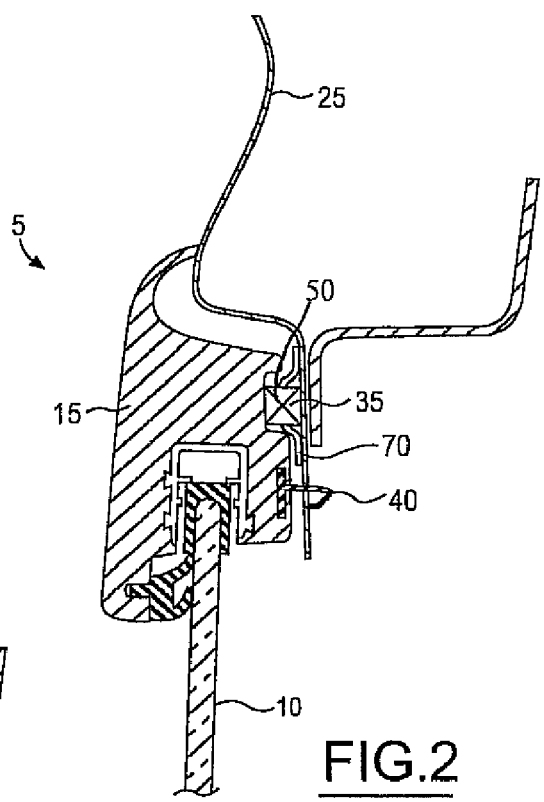
FIG. 2 is a sectional view of a second embodiment of a window assembly having an integral bonding system according to the present invention.
Figure 3:
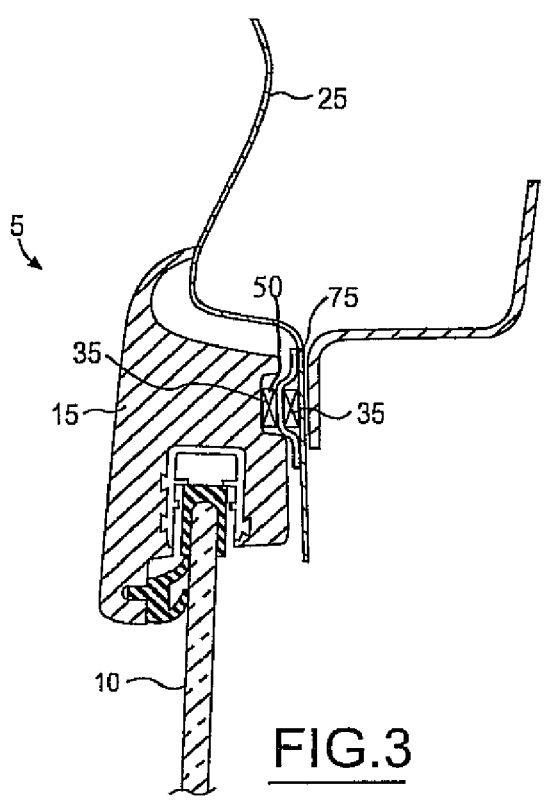
FIG. 3 is a sectional view of a third embodiment of a window assembly having an integral bonding system according to the present invention.
Figure 4:
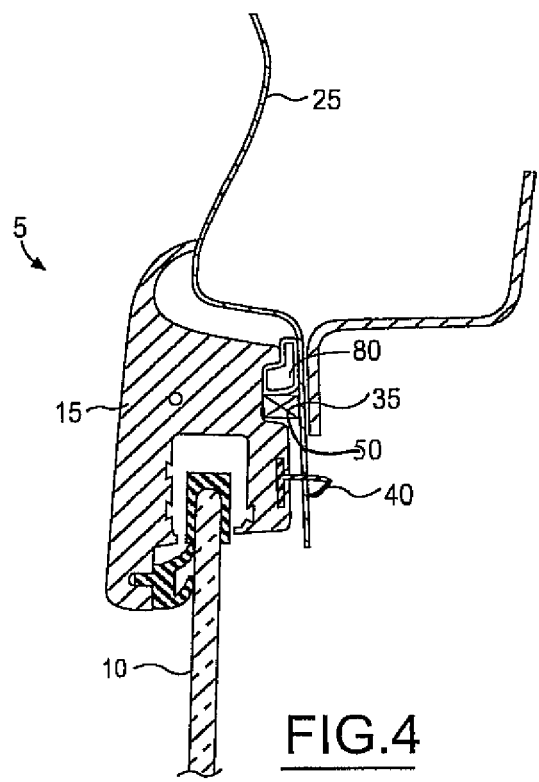
FIG. 4 is a sectional view of a fourth embodiment of a window assembly having an integral bonding system according to the present invention.

Referring to FIGS. 2-4 there are shown second, third and fourth embodiments of the present invention. The sheet metal 25 and encapsulation member 15 are the same as those described above. However, the adhesive members 35 are different from the circular or oval shape of that shown in FIG. 1. The adhesive member 35 of FIG. 2 is square shaped and includes two angular strips 70 extending outboard of the core 50. The strips 70 provide an additional sealing of the adhesive member 35 to prevent contamination after curing. Similarly, the adhesive members 35 of FIGS. 3 and 4 include additional strips associated with them. The third embodiment includes two rectangular adhesive members 35 separated by a strip 75, while the fourth embodiment includes a rectangular adhesive member 35 with one strip 80 extending from one side.

Figure 5:
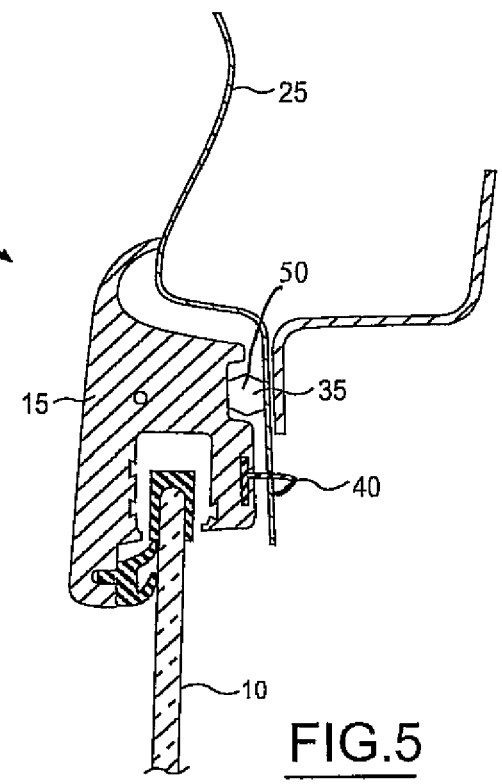
FIG. 5 is a sectional view of a fifth embodiment of a window assembly having an integral bonding system according to the present invention.

Referring to FIG. 5, there is shown a fifth embodiment of the present invention, with the adhesive member 35 having a hexagonal profile. The encapsulation member 15 and sheet metal 25 are as described above.

Figure 6:
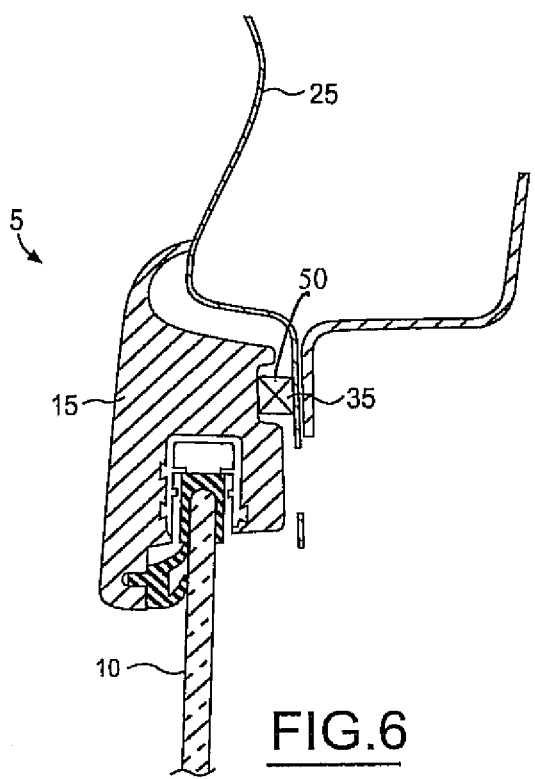
FIG. 6 is a sectional view of a sixth embodiment of a window assembly having an integral bonding system according to the present invention.

The sixth embodiment, shown in FIG. 6 includes a square shaped adhesive member 35, however, there is no fastener 40 associated with the encapsulation member 15.

Figure 7:
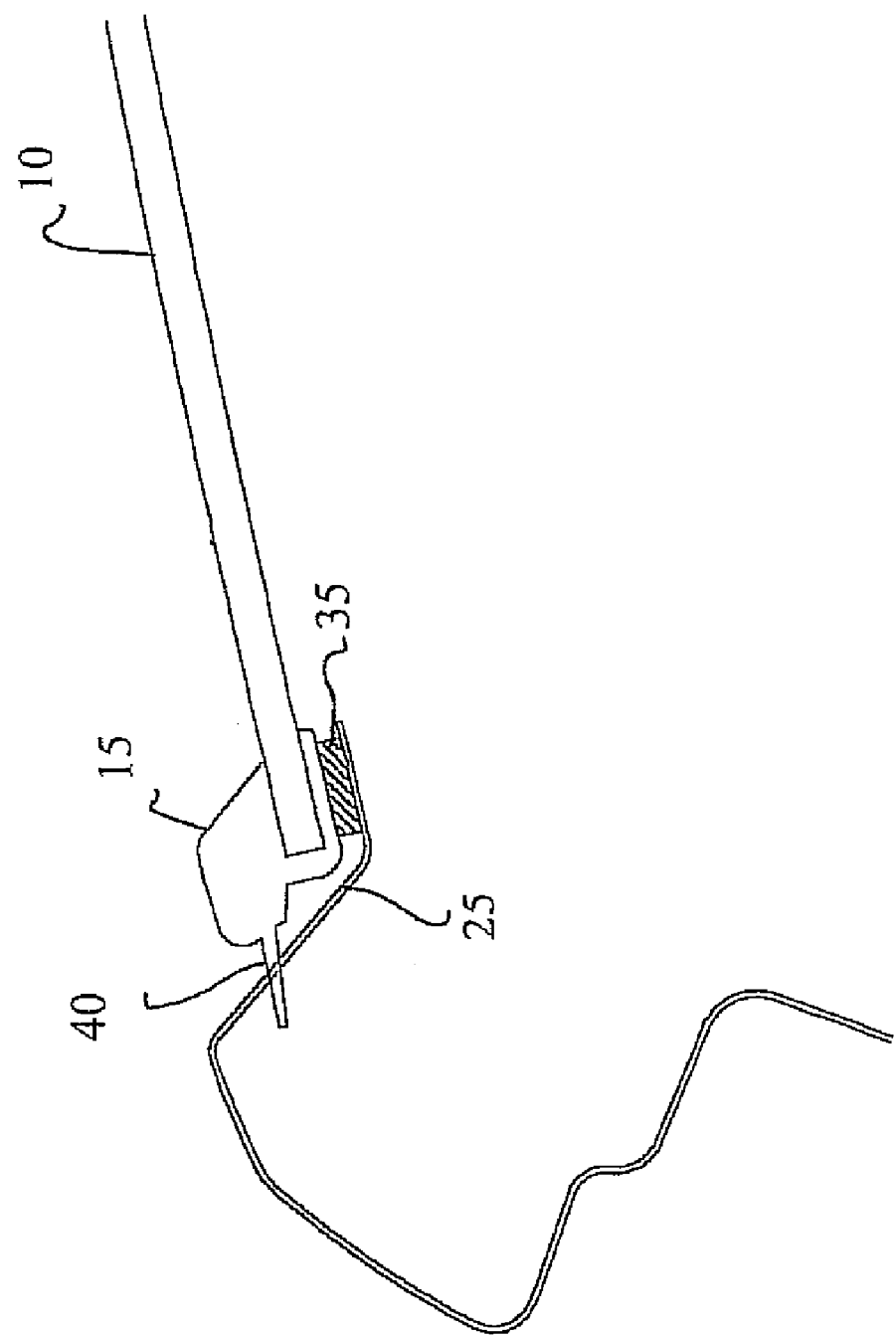
FIG. 7 is a sectional view of an alternative embodiment of a window assembly having an encapsulation member, and an integral bonding system.

Referring to FIG. 7 there is shown an alternative embodiment of the window assembly 5 of the present invention. The window assembly 5 includes a different encapsulation member 15 than that shown in FIGS. 1-6. The encapsulation member 15 is connected to the window 10 and may have a notch as previously described or the adhesive member 35 may be applied directly to the encapsulation member 15 as shown in FIG. 7. The location fastener 40 of the alternative embodiment is positioned on a side of the encapsulation member 15 and not on the inboard side 32 of the encapsulation member 15, as described above. The location fastener 40, as described above also locates the window 10 within a window opening defined by the margins of the material of the sheet metal 25 of the vehicle.

While several embodiments of a window system having an encapsulation member 15 have been disclosed, it is a further aspect of the present invention that the above described integrated bonding system may be utilized by a window assembly 5 with various designs and shapes for various window systems.

Figure 8:
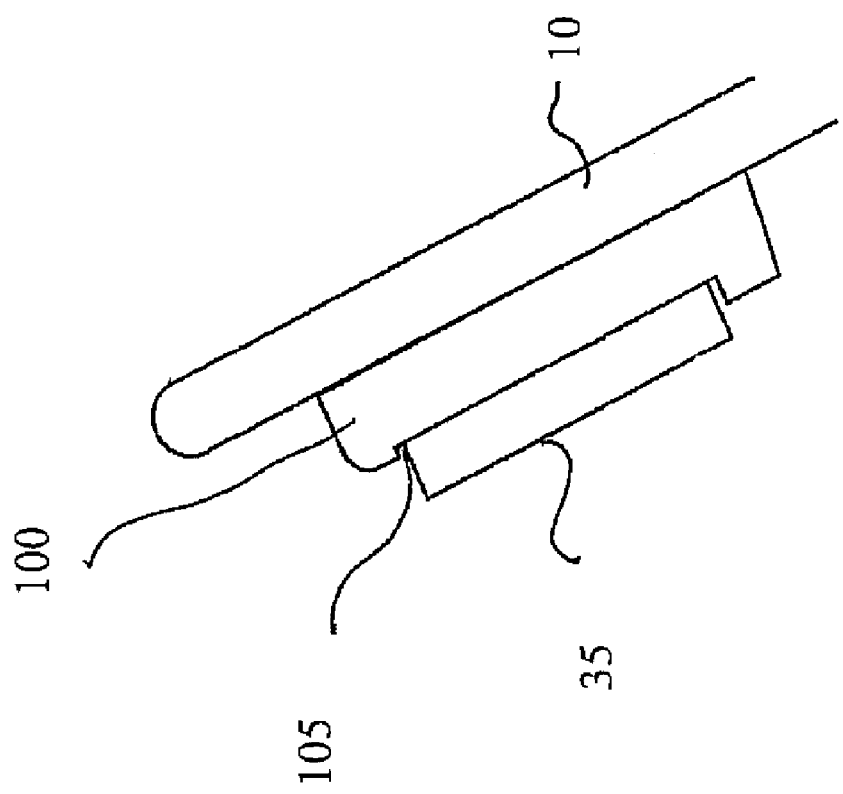
FIG. 8 is a sectional view of a window assembly including a window and frame having an adhesive member bonded thereon.
Figure 9:
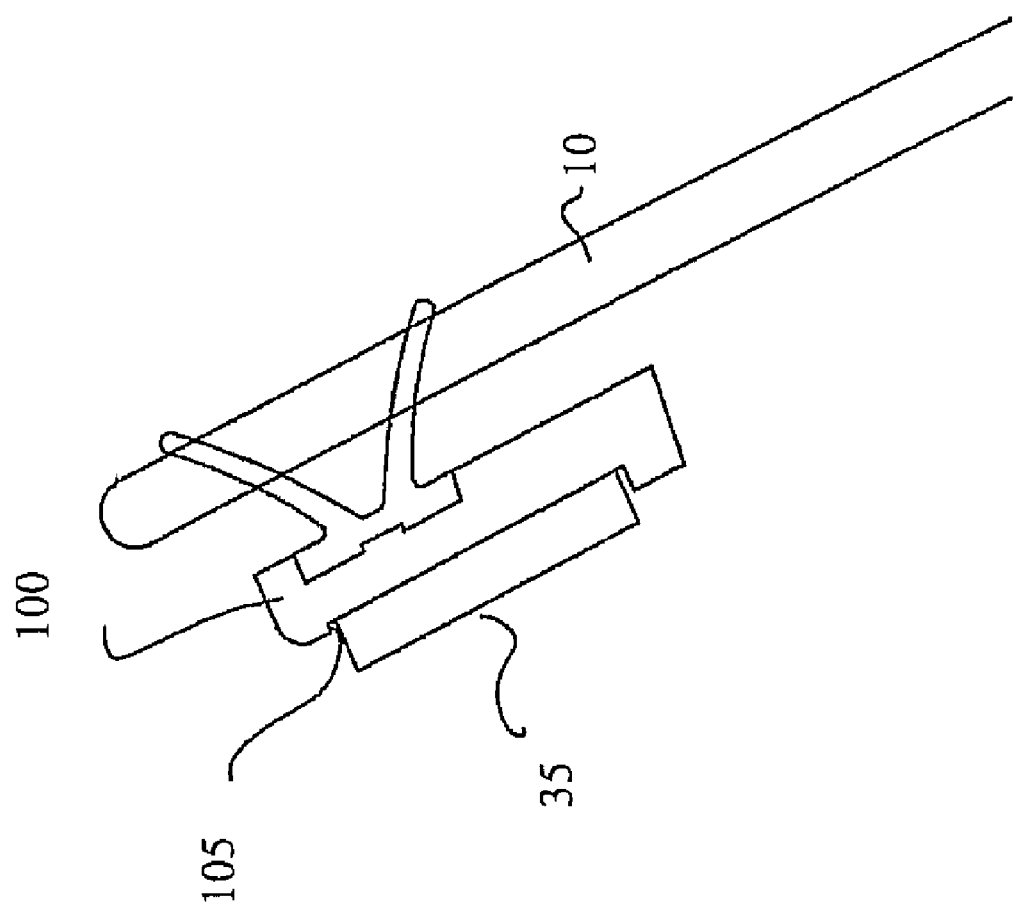
FIG. 9 is a sectional view of a window assembly including a window and frame having an adhesive member bonded thereon.

Referring to FIGS. 8 and 9, there is shown alternative embodiments of the window assembly 5 of the present invention. As shown in the figures, the window assembly 5 may include a frame 100 which can be bonded or attached to the sheet metal 25 in a similar manner as the above described embodiments. The window 10 having a frame 100 may have an adhesive member 35 bonded to the frame 100 prior to installation on a vehicle. The adhesive member 35 is then subsequently bonded to the sheet metal 25 of the vehicle. The frame 100 may include a notch 105 formed thereon in which the adhesive member 35 is disposed, or the adhesive member 35 may be attached directly to the surface of the frame 100. Various frames 100 may be utilized by the present invention. The frame 100 may be directly attached to the window 10 as shown in FIG. 8 or the frame 100 may be separated and attached to the window 10, as shown in FIG. 9. It is to be understood that any frame 100 may be utilized by the present invention.

Figure 10:
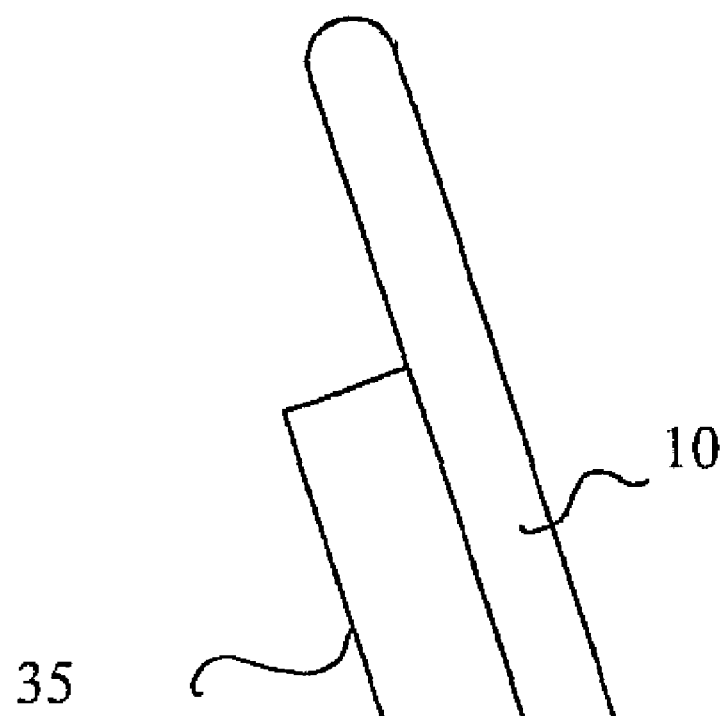
FIG. 10 is a sectional view of a window assembly including a window having an adhesive member bonded thereon.

Referring to FIG. 10, there is shown another alternative embodiment of the window assembly 5 of the present invention. The embodiment shown in FIG. 10 includes a window 10 which can be bonded or attached to sheet metal 25 in a similar manner as the above described embodiments. The window 10 may have an adhesive member 35 bonded to the window 10 prior to installation in the vehicle. The adhesive member 35 may then be subsequently bonded to the sheet metal 25 of the vehicle. It is also to be understood that any type of window 10 applied to an automobile may utilize the integrated bonding system defined by the present invention. Fixed windows or movable windows may include the adhesive member 35 of the present invention to attach the window 10 to the sheet metal 25 of a vehicle.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A window assembly for a vehicle comprising:
   a window opening defined by a margin of material;
   a window including an encapsulation member formed on the window, the window having an adhesive member bonded thereon prior to an installation operation on a vehicle;
   wherein the adhesive member is further bonded to the margin of material when the window assembly is attached to the vehicle.

2. The window assembly of claim 1 wherein the adhesive member is bonded to the encapsulation member.

3. The window assembly of claim 2, wherein the encapsulation member includes a notch formed on an inboard surface, the adhesive member positioned within the notch.

4. The window assembly of claim 1, wherein the adhesive member has a compressible core and adhesive on at least two sides.

5. The window assembly of claim 4, wherein the core is a foam material.

6. The window assembly of claim 4, wherein the core has a round shape.

7. The window assembly of claim 4, wherein The core has an oval shape.

8. The window assembly of claim 4, wherein the core has a square shape.

9. The window assembly of claim 4, wherein the core has a rectangular shape.

10. The window assembly of claim 4, wherein the core has a hexagonal shape.

11. The window assembly of claim 4, wherein the adhesive member includes at least one strip attached thereto.

12. The window assembly of claim 1, wherein the adhesive member has a cure time of at least 3 seconds.

13. The window assembly of claim 1 further comprising a locator on a vehicle for aligning the window with the window opening.

14. The window assembly of claim 1, wherein the adhesive member is a contact tape that fixes the window about the window opening on contact without the need for curing.

15. A window assembly for a vehicle comprising:
a window opening defined by a margin of material;
a window,
an encapsulation member formed on the window;
an adhesive member bonded to the encapsulation member prior to an installation operation on a vehicle;
the adhesive member further bonded to the margin of material when the window assembly is attached to the vehicle.

16. The window assembly of claim 15, wherein the encapsulation member includes a notch formed thereon, and the adhesive member positioned within the notch.

* * * * *